Jan. 15, 1929.
G. DEGENRING
1,698,717
VULCANIZING DEVICE
Filed Feb. 28, 1927
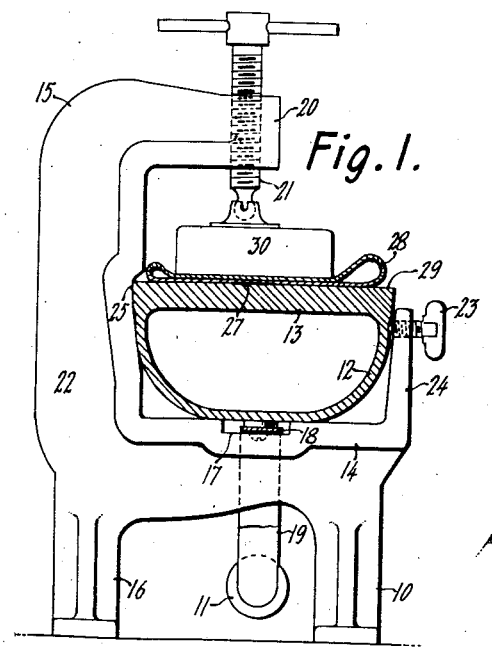
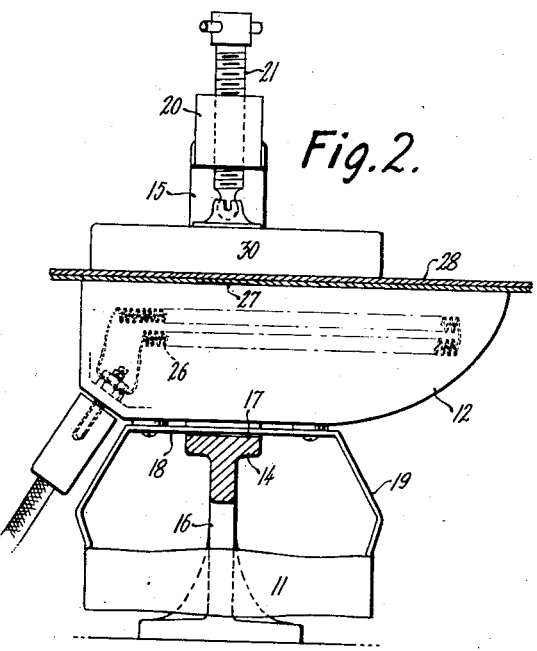
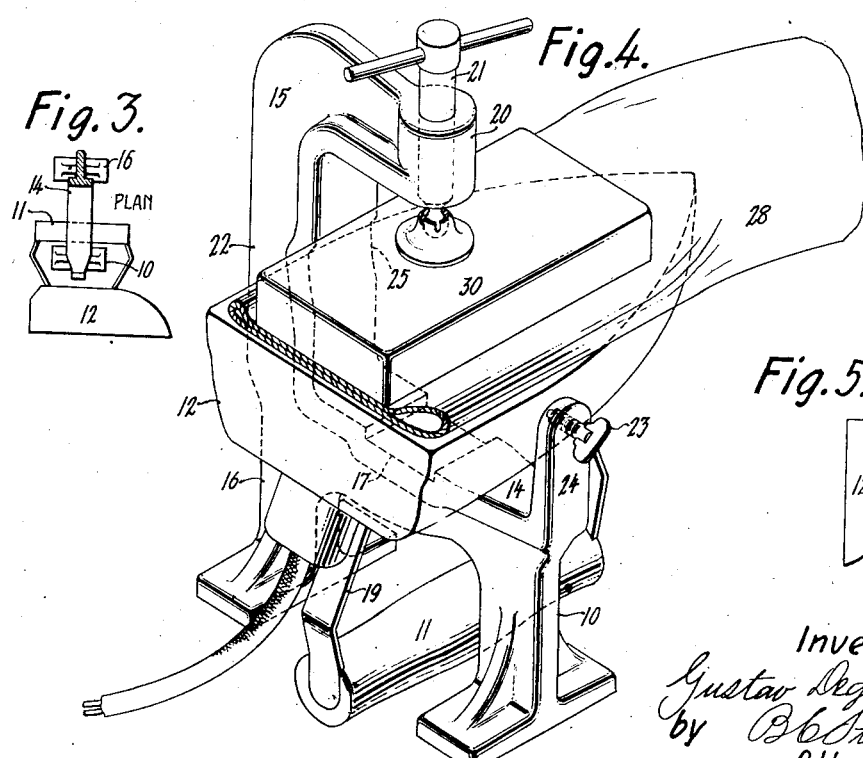
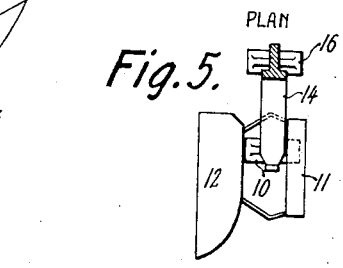
Inventor:
Gustav Degenring
by O. C. Stickney
Attorney Patented Jan. 15, 1929.

1,698,717

UNITED STATES PATENT OFFICE.

GUSTAV DEGENRING, OF ELIZABETH, NEW JERSEY.

VULCANIZING DEVICE.

Application filed February 28, 1927. Serial No. 171,488.

The invention relates to repair devices for vulcanizing rubber to fill punctures or repair tears in the inner tubes of tires for automobiles, etc.

The object of the invention is to provide a simple, compact, quickly operating, reliable and inexpensive means for this purpose, and to make it feasible for every private garage to be provided with a tube-repairing outfit at trifling expense, and usually without occupying floor room.

To this and other ends, it is a feature of the invention to utilize an ordinary electrically-heated household flatiron for the purpose of supplying the heat required for curing the raw rubber and cement which are applied to the puncture or tear. The flatiron may serve its ordinary purpose as a household utensil, while serviceable at any time for repairing a rubber tube.

The flatiron is detachably mounted in inverted position upon a stand or cradle, which may rest upon a bench, or upon the running board of an automobile. The flatiron is secured to the stand prior to heating, which is a convenience and time-saver. Then the iron is heated by the electric current (obtained from a house circuit, or from the battery of the automobile) to the required point, which is reached when water dropped upon the iron will sizzle. This heat is reached in two or three minutes, and much time is saved, as compared with ordinary vulcanizers which require half an hour to heat. The electric current is then turned off, and the iron retains sufficient heat to last until it effects a high grade of vulcanization of the cement and raw rubber upon the punctured or torn tube. The tube, to which the raw patch has been applied, is laid, patch down, upon the hot flatiron. The pressure necessary for the vulcanizing operation may be secured by means of a block, which may be laid upon the flattened-out rubber tube, and may be held down thereon at vulcanizing pressure by means of a clamping head provided upon the stand. The iron, owing to its bulk, keeps its heat at the vulcanizing point for a long time. After a suitable period, say ten or fifteen minutes, the block is removed, and the tube is taken off and found to have an excellent, smooth patch, which is thoroughly incorporated with the rubber of the tube. The flatiron may be then taken from the stand and returned to the kitchen for household use. The invention, however, is not limited to the use of an electrically-heated flatiron or sad-iron.

Other features and advantages will hereinafter appear.

In the accompanying drawings,

Figure 1 is a sectional elevation of a flatiron detachably mounted in a stand, according to one form of the present invention.

Figure 2 is a longitudinal section of the same.

Figure 3 is a sectional plan illustrating the first step in mounting the flatiron upon the type of stand seen at Figure 1.

Figure 4 is a perspective view illustrating the vulcanizing operation.

Figure 5 is a sectional plan showing the second step in mounting the flatiron upon the stand.

As seen at Figure 3, one of the legs 10 of the preferred form of clamp is thrust through the handle 11 of a flatiron 12 having a heavy heat-retaining base 13. Then the flatiron is turned around from the Figure 3 position to the Figure 5 position. Then it may be lifted up and bedded in inverted position upon the base or lower jaw 14 of a clamp 15, said jaw constituting the top of a stand which may preferably have front and rear legs 10, 16; this jaw or bed having a depression 17 to accommodate the horizontal bar 18 of the usual handle-strap 19. The clamp also includes an upper jaw 20, through which is threaded a clamp-screw 21 above the inverted flatiron. Said jaws 14, 20 may be formed integrally one at the bottom and the other at the top of the back portion 22 of the clamp which unites them. Other means may be provided for supporting the clamp in vulcanizing position.

The flatiron is preliminarily set in place and preferably secured by means of a thumb-screw 23 passing through a lug 24 which rises at the front of the clamp and presses the flatiron against the back 22 of the clamp. Said back or standard may have a recess 25 to catch over the edge of the flatiron, and co-operate with 23 to hold the iron. The flatiron being in position, the electric current is turned on in the heating circuit 26, to bring the iron base 13 to the required vulcanizing heat, and then the current is turned off. Then a patch of cement and raw rubber is applied in the usual way upon the puncture or tear in the tube, at 27, and the patched tube 28 is laid upon the smooth working surface 29 of the inverted hot flatiron, the patch being placed preferably upon the middle portion of the iron. Then a block 30 is laid upon the flattened tube 28, and the screw 21 is turned to clamp down the block and tube, until a suitable vulcanizing pressure is obtained.

The apparatus is allowed to remain in this condition until the patch becomes sufficiently vulcanized. The retained heat of the bottom or bed 13 of the iron is sufficient to effect the desired quality of vulcanization, and the patch, upon being removed, is found to be very smooth and flush with the surface of the tube, which is a desideratum; the new rubber being fused right into the old rubber. The work is found to be as well done as if the repair had been made by the most expensive vulcanizer of ordinary or standard type.

Where it is necessary to repair a tear, the process is the same as described, the cement and raw rubber being applied for a portion of the length of the tear, and such portion being vulcanized in the described manner; whereupon the block 30 is removed and the tube 28 is taken off and another patch is applied to the next portion of the tear. Thereupon the flatiron is reheated, and the tube is replaced upon the same, with the fresh raw rubber in contact with the flatiron. After this portion is vulcanized, the operation is repeated for the next portion, and so on along the tear until the tube is completely mended. The device may be of a size to accommodate a variety of sizes of flatirons and sad-irons.

The invention is not limited to a stand of the illustrated design, inasmuch as a vulcanizing clamp for a flatiron may be constructed in a variety of ways, and may be supported in a variety of ways upon a bench or upon the wall of a garage.

Variations may be resorted to within the scope of the invention, and portions of the improvements may be used without others.

Having thus described my invention, I claim:

1. An apparatus of the character described, including a stand, a flatiron detachably mounted upon said stand in inverted position, said stand having a support for said flatiron and also having means for subjecting to vulcanizing pressure work placed upon the working surface of said flatiron, and means to engage the side of the flatiron to retain it upon the stand.

2. An apparatus of the character described, including a stand, a flatiron detachably mounted upon said stand in inverted position, said stand having a support for said flatiron and also having means for subjecting to vulcanizing pressure work placed upon the working surface of said flatiron, and means to engage the side of the flatiron to retain it upon the stand, said stand having a base or jaw provided with a cut-away for the strap of the flatiron handle, and also having at its back a depression to receive one side edge of the flatiron, and means to secure the flatiron in said depression.

3. As a new article of manufacture, a complete unit for vulcanizing a patch upon a rubber tube, including a stand or cradle fitted to constitute a firm support for an upset household flatiron having its flat smoothing surface exposed to form a flat vulcanizing bed, said stand including a firm fitted support or cradle for a household flatiron and having releasable means to lock the inverted flatiron to the cradle and also releasable means for clamping the work upon the inverted surface of the flatiron.

4. A device for vulcanizing a patch upon a rubber tube, including a stand or cradle fitted to constitute a firm support for an upset household flatiron having its smoothing surface exposed, said stand including a bed to receive the flatiron in inverted condition, and also including a jaw through which is threaded a screw for co-operation with a block to clamp the tube upon the inverted surface of the flatiron, and also including a screw to engage the side of the flatiron to retain it upon the bed.

5. A device for vulcanizing a patch upon a rubber tube, including a stand or cradle fitted to constitute a firm support for an upset household flatiron having its smoothing surface exposed, said stand including a bed to receive the flatiron in inverted condition, and also including a jaw through which is threaded a screw for co-operation with a block to clamp the tube upon the inverted surface of the flatiron, and also including a screw to engage the side of the flatiron to retain it upon the bed, said device having a notch opposed to said side screw to co-operate therewith in securing the flatiron.

GUSTAV DEGENRING.